United States Patent Office 3,480,391
Patented Nov. 25, 1969

3,480,391
HYDROXYLAMINE SOLUTIONS STABILIZED WITH AN AMIDE OXIME AND METHOD FOR THEIR PREPARATION
Donald D. Carlos, Crown Point, Ind., assignor to Sinclair Research, Inc., New York, N.Y., a corporation of Delaware
No Drawing. Filed Aug. 24, 1967, Ser. No. 662,859
Int. Cl. C01b 21/14; C09k 3/00
U.S. Cl. 23—190                8 Claims

ABSTRACT OF THE DISCLOSURE

Hydroxylamine in aqueous solution stabilized from oxidation deterioration with an amide oxime present in a small amount, usually about .01 to 1 wt. percent based upon the aqueous solution, said amide oxime having about 1 to 10 carbon atoms and molecular weight from about 60 to 200.

---

This invention relates to stabilized hydroxylamine in aqueous solution.

Aqueous solutions containing hydroxylamine are widely used in synthesis work but the instability of the reagent greatly limits its utility in cases where storage is necessary and in reactions where product purity is important. The problem of instability of aqueous solutions containing hydroxylamine is particularly serious when these solutions are obtained by ion-exchange techniques.

It has been found that amide oximes, when present in extremely low concentrations, exhibit a remarkable inhibiting effect toward autoxidation of hydroxylamine in aqueous solution. Amide oximes show a superior inhibiting effect over, for instance, the tetrasodium salt of ethylenediamine-tetra-acetic acid.

According to the invention, hydroxylamine in aqueous solution can be stabilized from oxidation deterioration with an amide oxime. The amount of amide oxime can be a small amount sufficient to inhibit oxidative deterioration of the hydroxylamine and usually is about 0.01 to 1 wt. percent or more of the aqueous solution and preferably can be about 0.05 to 0.5 wt. percent. The aqueous solution containing hydroxylamine can be produced by the reaction of a hydroxylamine hydrohalide salt in aqueous solution, such as hydroxylamine hydrochloride, with an alkali metal hydroxide, such as sodium hydroxide. Hydroxylamine hydrosulfate or any other suitable acid salt or other convenient form can also be used. The hydroxylamine is usually at least about 1 wt. percent of the aqueous solution and can be up to saturation or more, but is conveniently about 3 to 15 wt. percent.

The amide oxime can have about 1 to 10 carbon atoms with a molecular weight from about 60 to 200. A suitable amide oxime is benzamide oxime.

The present invention will be more clearly understood from a consideration of the following example.

EXAMPLE

A series of samples were prepared wherein hydroxylamine in aqueous solution was stabilized by the addition of an inhibiting agent. The aqueous solution containing hydroxylamine was prepared from neutralization of hydroxylamine hydrochloride in aqueous solution with sodium hydroxide. All samples were stored in capped bottles upon the bench top at room temperature. The inhibiting agent was added in an amount of 0.1 percent by weight of the sample to the various samples, each sample containing approximately 7.15 percent by weight of hydroxylamine.

The Raschig method for the determination of hydroxylamine was used in the present experiments. This method involves the quantitative oxidation of hydroxylamine to nitrous oxide by ferric ion in strongly acid solution. The ferrous ion so formed is determined by titration with standard permanganate.

The details and results obtained using the different inhibiting agents are given in the table below.

PERCENT HYDROXYLAMINE IN SAMPLE AT TIMES INDICATED

| Inhibiting Agent | Hours | | | | | |
|---|---|---|---|---|---|---|
| | 0 | 4 | 30 | 54 | 78 | 438 |
| No inhibiting agent | 7.15 | 6.91 | 5.22 | 3.78 | 1.71 | 0.00 |
| Tetra-sodium salt of ethylenediamine-tetra-acetic acid | 7.15 | | 6.92 | 6.69 | | 3.85 |
| Benzamide oxime | 7.15 | | | | 7.00 | 6.72 |

As shown in the above table, the sample having no inhibiting agent was almost completely decomposed in 78 hours. The sample stabilized with benzamide oxime showed little deterioration after 438 hours (over 18 days) while the sample stabilized with the tetra-sodium salt of ethylenediamine-tetra-acetic acid showed nearly 50% decomposition.

As alternatives for benzamide oxime there can be used in the same manner other aliphatic and aromatic amide oximes, particularly alkyl and aryl amide oximes, such as acetamide oxime, formamide oxime, propionamide oxime, and iso and tere-phthalamide oximes to effectively inhibit the oxidative deterioration of hydroxylamine in aqueous solution.

It is not necessary to add the amide oxime in oxime form. The addition of a substance capable of reacting with hydroxylamine in aqueous solution to form an amide oxime will bring about stabilization of hydroxylamine. Illustrative of the types of compounds that may be used are aliphatic and aromatic mono and polynitriles having about 1 to 10 carbon atoms such as acetonitrile, formonitrile, propionitrile, benzonitrile, and iso- and tere-phthalo nitriles.

It is claimed:
1. Hydroxylamine in aqueous solution containing a small amount of an amide oxime effective to inhibit oxidation deterioration of the hydroxylamine, said amide oxime being selected from the group consisting of aliphatic and aromatic amide oximes and having about 1 to 10 carbon atoms and a molecular weight from about 60 to 200.

2. The hydroxylamine in aqueous solution of claim 1 wherein said amide oxime is present in an amount of about 0.01 to 1 wt. percent based on the aqueous solution.

3. The hydroxylamine in aqueous solution in claim 1 wherein said amide oxime is benzamide oxime.

4. The hydroxylamine in aqueous solution of claim 3 wherein said benzamide oxime is present in an amount of about 0.01 to 1 wt. percent based on the aqueous solution.

5. A method of stabilizing hydroxylamine in aqueous solution from oxidation deterioration which comprises adding thereto a small amount of a compound having about 1 to 10 carbon atoms, and a molecular weight from about 60 to 200, selected from the group consisting of aliphatic and aromatic amide oximes and their corresponding nitriles which react with hydroxylamine in aqueous solution to form an amide oxime.

6. The method of claim 5 wherein the compound having about 1 to 10 carbon atoms and a molecular weight from about 60 to 200 selected from the group consisting of aliphatic and aromatic amide oximes and their corresponding nitriles, which react with hydroxylamine in aqueous solution to form an amide oxime, is added in an amount of about 0.01 to 1 weight percent based on the aqueous solution.

7. The method of claim 6 wherein the compound added thereto is benzamide oxime.

8. The method of claim 6 wherein the compound added thereto is benzonitrile.

References Cited

UNITED STATES PATENTS

| 2,307,929 | 1/1943 | Joyce. | |
|---|---|---|---|
| 2,719,778 | 10/1955 | Jockers et al. | |
| 3,153,565 | 10/1964 | Dithmar et al. | 23—207.5 |

OSCAR R. VERTIZ, Primary Examiner

HOKE S. MILLER, Assistant Examiner

U.S. Cl. X.R.

252—380